UNITED STATES PATENT OFFICE.

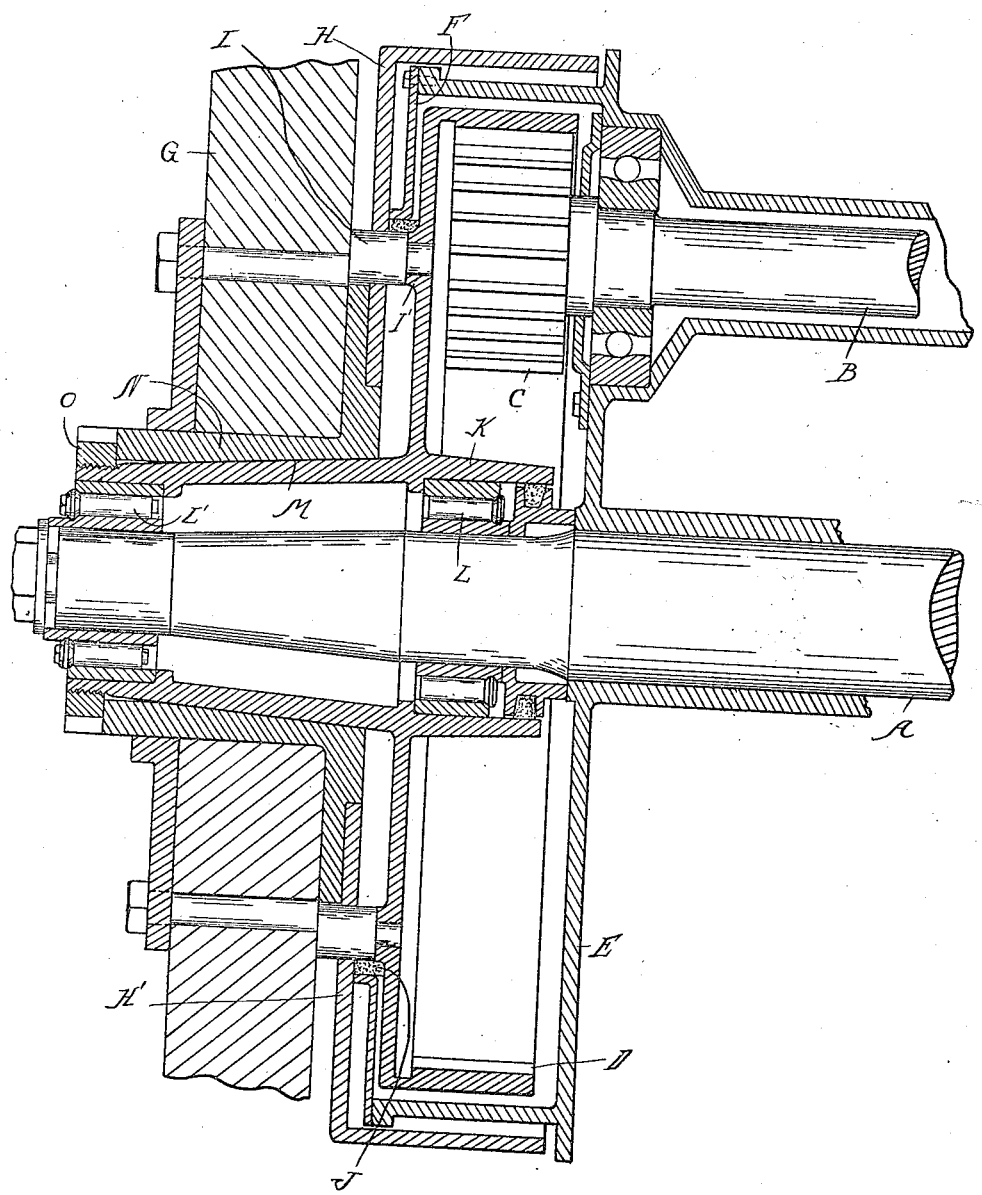

ALBERT W. RUSSEL, OF DETROIT, MICHIGAN, ASSIGNOR TO RUSSEL MOTOR AXLE COMPANY, OF DETROIT, MICHIGAN, A CORPORATION OF MICHIGAN.

VEHICLE DRIVE-AXLE.

1,258,947.

Specification of Letters Patent. Patented Mar. 12, 1918.

Application filed May 3, 1917. Serial No. 166,076.

*To all whom it may concern:*

Be it known that I, ALBERT W. RUSSEL, a citizen of the United States of America, residing at Detroit, in the county of Wayne and State of Michigan, have invented certain new and useful Improvements in Vehicle Drive-Axles, of which the following is a specification, reference being had therein to the accompanying drawings.

The invention relates to vehicle drive axles of that type including a jack-shaft and driving transmission between said shaft and the vehicle wheels. It is the object of the invention to obtain a construction in which the vehicle wheel may be removed and replaced without disturbance of the transmission mechanism, and to this end the invention comprises the novel construction as hereinafter set forth.

In the drawing, the device is represented in vertical central section.

A is the axle, B is the jack-shaft, C is a pinion mounted on the jack-shaft and D is an internal gear-wheel meshing with and embracing said pinion and mounted concentric to the axle. E is a housing for inclosing the intermeshing gears, provided with an annular removable cover F on its outer side. G is the vehicle wheel having attached thereto a brake-drum H surrounding the housing E.

Heretofore axles have been provided with transmission connections including an internal gear-wheel and pinion upon the jack shaft, but with such constructions it is usual to mount the internal gear upon the vehicle wheel so as to necessitate the opening of the housing when said wheel is to be removed. This is objectionable both on account of the labor involved in opening the housing and also because this necessitates the draining off of the lubricant. With the present invention I have devised a construction in which the internal gear is mounted upon the axle independent of the vehicle wheel, and the latter is detachably connected with said gear-wheel and independently, removably mounted on the axle.

I are pins secured to bosses I' on the web of the internal gear-wheel D, and which have projecting portions engageable with apertures in the web H' of the brake-drum H. J is a packing for closing the joint between the inner edge of the cover F and the internal gear-wheel D.

With the construction as described, in assembling the parts, the hub K of the internal gear-wheel D is first engaged with the roller bearings L and L' on the axle, and the gear is placed in mesh with the pinion C upon the jack-shaft B. The cover F is then secured in position, after which the wheel G is mounted by slipping the hub N upon the tapering portion M of the hub K and clamping the same by the nut O. During this engagement the apertures in the web H' of the brake-drum H are engaged with the driving pins J so as to communicate the torque of the gear-wheel directly to the hub of the wheel. It will also be noted that the brake-drum H surrounds the housing E.

Whenever it is desired to remove the wheel, this may be accomplished without disturbance of the gear-wheel D or opening of the housing E, it being only necessary to remove the nut O and slipping the tapering hub N off from the tapering bearing M. The hub K has an inwardly-projecting portion which extends into the plane of the teeth of the gear-wheel and thus the driving thrust of the pinion will be transmitted to this portion of the hub, avoiding any tendency to twist or skew the gear.

What I claim as my invention is:

1. The combination with an axle, of a jack-shaft arranged parallel thereto, a pinion on said jack-shaft, an internal gear-wheel concentric with said axle and meshing with said pinion, a housing for inclosing said gear-wheel and pinion, and a vehicle wheel removably mounted on said axle and having a detachable driving engagement with said gear-wheel, permitting of the removal of said wheel independent of said housing.

2. The combination with an axle, of a jack-shaft arranged parallel thereto, a pinion on said jack-shaft, an internal gear-wheel in mesh with said pinion and arranged concentric to said axle, a bearing for said gear-wheel on said axle in the plane of the intermeshing teeth, a housing for inclosing said gear-wheel and pinion, and a vehicle wheel removably mounted on said axle, having a detachable driving engagement with said gear-wheel.

3. The combination with an axle, of a jack-shaft arranged parallel thereto, a pinion on said jack-shaft, an internal gear-wheel in mesh with said pinion and arranged concentric with said axle, a hub for said gear-wheel on said axle, a housing inclosing said gear-wheel and pinion, and a vehicle wheel detachably engaging said hub.

4. The combination with an axle, of a jack-shaft arranged parallel thereto, a pinion on said jack-shaft, an internal gear-wheel in mesh with said pinion and having a hub concentric with said axle, bearings at opposite ends of said hub upon said axle, and a vehicle wheel having a hub engageable with the hub of said gear-wheel to form a detachable driving connection therebetween.

5. The combination with an axle, of a jack-shaft arranged parallel thereto, a pinion on said jack-shaft, an internal gear-wheel in mesh with said pinion and provided with a hub having an inwardly-extending portion in the plane of the intermeshing teeth and an outwardly-extending portion providing a tapering seat, bearings for said hub upon said axle, a vehicle wheel, a hub for said wheel engageable with the tapering portion of the hub for said gear-wheel, and clamping means for securing the hub of the vehicle wheel upon the hub of the gear-wheel, for the purpose described.

In testimony whereof I affix my signature.

ALBERT W. RUSSEL.